(12) United States Patent
Gonze et al.

(10) Patent No.: US 8,813,478 B2
(45) Date of Patent: Aug. 26, 2014

(54) SELECTIVE CATALYTIC REDUCTION (SCR) SYSTEM FOR NOX STORAGE

(75) Inventors: Eugene V. Gonze, Pinckney, MI (US); Michael J. Paratore, Jr., Howell, MI (US); Chang H. Kim, Rochester, MI (US); Steven J. Schmieg, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 283 days.

(21) Appl. No.: 13/327,291

(22) Filed: Dec. 15, 2011

(65) Prior Publication Data

US 2013/0152553 A1    Jun. 20, 2013

(51) Int. Cl.
*F01N 3/00* (2006.01)
(52) U.S. Cl.
USPC .................. 60/286; 60/282; 60/285; 60/297; 60/299
(58) Field of Classification Search
USPC .................................................. 60/274–324
See application file for complete search history.

(56) References Cited

U.S. PATENT DOCUMENTS

| 6,235,254 | B1 * | 5/2001 | Murphy et al. | 423/212 |
|---|---|---|---|---|
| 6,477,831 | B1 * | 11/2002 | Ballinger et al. | 60/284 |
| 6,912,840 | B2 * | 7/2005 | Posselt et al. | 60/274 |
| 7,178,331 | B2 * | 2/2007 | Blakeman et al. | 60/301 |
| 8,464,524 | B2 * | 6/2013 | Bidner et al. | 60/309 |
| 2008/0223019 | A1 * | 9/2008 | Gonze et al. | 60/286 |
| 2008/0282686 | A1 * | 11/2008 | Gonze et al. | 60/300 |
| 2009/0056315 | A1 * | 3/2009 | Solbrig et al. | 60/286 |
| 2011/0056190 | A1 * | 3/2011 | Nakata et al. | 60/286 |
| 2011/0219747 | A1 * | 9/2011 | Geveci et al. | 60/274 |

* cited by examiner

*Primary Examiner* — Jesse Bogue
(74) *Attorney, Agent, or Firm* — Cantor Colburn LLP

(57) ABSTRACT

An exhaust gas treatment system for an internal combustion engine is provided, including an exhaust gas conduit, a flow-through container of absorbent particles, an electrically heated catalyst ("EHC") device, a selective catalytic reduction ("SCR") device, and a control module. The exhaust gas conduit is in fluid communication with, and is configured to receive an exhaust gas from the internal combustion engine. The exhaust gas contains oxides of nitrogen ("$NO_x$") and water. The flow-through container of absorbent particles is in fluid communication with the exhaust gas conduit and configured to receive the exhaust gas. The flow-through container substantially adsorbs the water from the exhaust gas below a threshold temperature. The EHC device is in fluid communication with the exhaust gas conduit and is configured to receive the exhaust gas. The EHC device is located downstream of the flow through container, and is selectively activated to produce heat.

20 Claims, 3 Drawing Sheets

SELECTIVE CATALYTIC REDUCTION (SCR) SYSTEM FOR NOX STORAGE

FIELD OF THE INVENTION

Exemplary embodiments of the invention relate to exhaust gas treatment systems for internal combustion engines and, more particularly, to an exhaust gas treatment system having an electrically heated catalyst ("EHC") and a flow-through container of absorbent particles that substantially adsorb water from the exhaust gas below a threshold temperature.

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

One type of exhaust treatment technology for reducing CO and HC emissions is an oxidation catalyst device ("OC"). The OC device includes a flow-through substrate and a catalyst compound applied to the substrate. The catalyst compound of the OC induces an oxidation reaction of the exhaust gases once the OC device has attained a threshold or light-off temperature. One type of exhaust treatment technology for reducing $NO_x$ emissions is a selective catalytic reduction ("SCR") device that may be positioned downstream of the OC device. The SCR device includes a substrate, having a SCR catalyst compound applied to the substrate. A reductant is typically sprayed into hot exhaust gases upstream of the SCR device. The reductant may be a urea solution that decomposes to ammonia ("$NH_3$") in the hot exhaust gases and is adsorbed by the SCR device. The ammonia then reduces the $NO_x$ to nitrogen in the presence of the SCR catalyst. The SCR device needs to reach a threshold or light-off temperature to effectively reduce the $NO_x$ to nitrogen. Before reaching the threshold or light-off temperature, the SCR acts as a $NO_x$ adsorber in the presence of stored $NH_3$. Specifically, the SCR device traps $NO_x$ and stores the $NO_x$ by forming intermediates such as ammonium nitrates and/or nitrites with $NH_3$ until the light-off temperature has been reached. Once the light-off temperature is attained, the $NO_x$ is reduced to nitrogen in the presence of the SCR catalyst.

In addition to the gaseous emissions emitted from an internal combustion engine, the exhaust gas also contains water vapor. Specifically, for example, the exhaust gas of a diesel engine typically contains between about 0.5 to about 8 percent water vapor. However, water vapor in the exhaust gas may decrease the $NO_x$ adsorption capacity over the SCR catalyst compound before reaching the light-off temperature. Accordingly, it is desirable to provide an efficient approach for limiting the amount of water vapor in the presence of the SCR device before the SCR device reaches the light-off temperature.

SUMMARY OF THE INVENTION

In one exemplary embodiment of the invention, an exhaust gas treatment system for an internal combustion engine is provided, including an exhaust gas conduit, a flow-through container of absorbent particles, an electrically heated catalyst ("EHC") device, a selective catalytic reduction ("SCR") device, and a control module. The exhaust gas conduit is in fluid communication with, and is configured to receive an exhaust gas from the internal combustion engine. The exhaust gas contains oxides of nitrogen ("$NO_x$") and water. The flow-through container of absorbent particles is in fluid communication with the exhaust gas conduit and configured to receive the exhaust gas. The flow-through container substantially adsorbs the water from the exhaust gas below a threshold temperature. The EHC device is in fluid communication with the exhaust gas conduit and is configured to receive the exhaust gas. The EHC device is located downstream of the flow through container, and is selectively activated to produce heat. The SCR device is in fluid communication with the exhaust gas conduit and is configured to receive the exhaust gas. The SCR device is located downstream of the flow through container. The SCR device is selectively heated by the EHC device to a light-off temperature. The overall temperature of the SCR device is represented by a SCR temperature profile. The control module is in communication with the EHC device. The control module includes a control logic for determining the SCR temperature profile. The control module also includes a control logic for activating the EHC device if the SCR temperature profile is below the light-off temperature. The EHC device is selectively activated to heat the SCR device to the light-off temperature before the flow-through container of absorbent particles reaches the threshold temperature.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
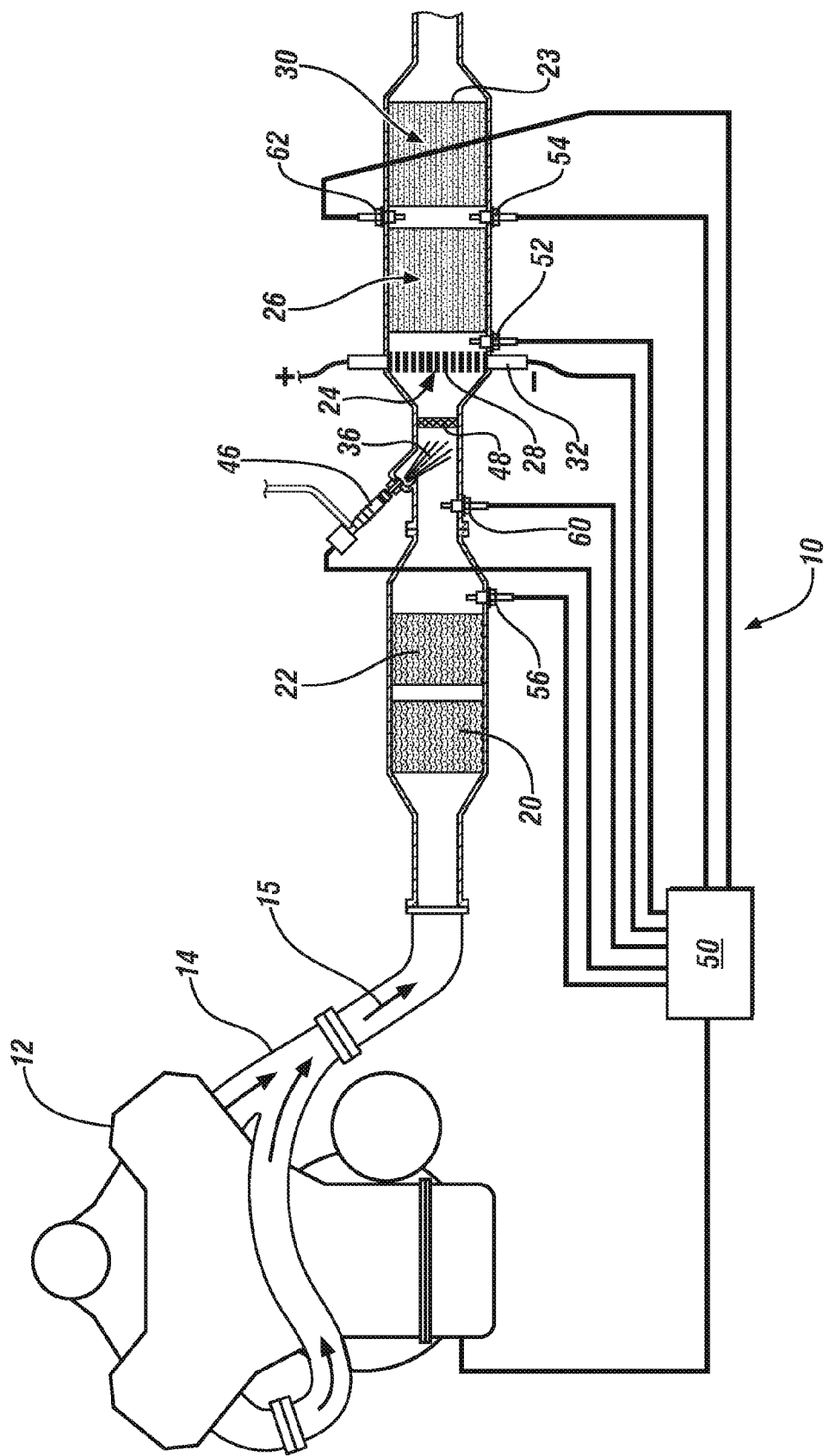
FIG. 1 is a schematic diagram of an exemplary exhaust gas treatment system.

Referring now to FIG. 1, an exemplary embodiment is directed to an exhaust gas treatment system 10, for the reduction of regulated exhaust gas constituents of an internal combustion (IC) engine 12. The exhaust gas treatment system described herein can be implemented in various engine systems that may include, but are not limited to, diesel engine systems, gasoline direct injection systems, and homogeneous charge compression ignition engine systems.

The exhaust gas treatment system 10 generally includes one or more exhaust gas conduits 14, and one or more exhaust treatment devices. In the embodiment as illustrated, the exhaust gas treatment system devices include an oxidation catalyst device ("OC") 20, a flow-through container of absorbent particles 22, an electrically heated catalyst ("EHC") device 24, a selective catalytic reduction device ("SCR") 26, and a particulate filter device ("PF") 30. As can be appreciated, the exhaust gas treatment system of the present disclosure may include various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the IC engine 12 to the various exhaust treatment devices of the exhaust gas treatment system 10. The OC device 20 may include, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other metal oxide catalysts such as perovksites, or combination thereof. The OC device 20 is useful in treating unburned gaseous and non-volatile HC and CO, which are oxidized to form carbon dioxide and water.

The flow-through container of absorbent particles 22 is located downstream of the OC device 20. The flow-through container of absorbent particles 22 may include, for example, a flow-through metal or ceramic monolith substrate that may be packaged in a stainless steel shell or canister having an inlet and an outlet in fluid communication with exhaust gas conduit 14. The substrate may include a washcoat of water absorbent particles such as, for example, alumina particles, activated carbon particles, water absorbent zeolite materials, water absorbent molecular sieve materials, and metal-organic frameworks ("MOF") materials. Specifically, the water absorbent particles are configured for temporarily storing water collected from the exhaust gas 15 below a threshold temperature. In one embodiment, the threshold temperature is about 100° C. The exhaust gas 15 warms the flow-through container of absorbent particles 22 to the threshold temperature. Once the flow-through container of absorbent particles 22 reaches the threshold temperature, substantially all of the water that has been absorbed is released.

Figure 2:
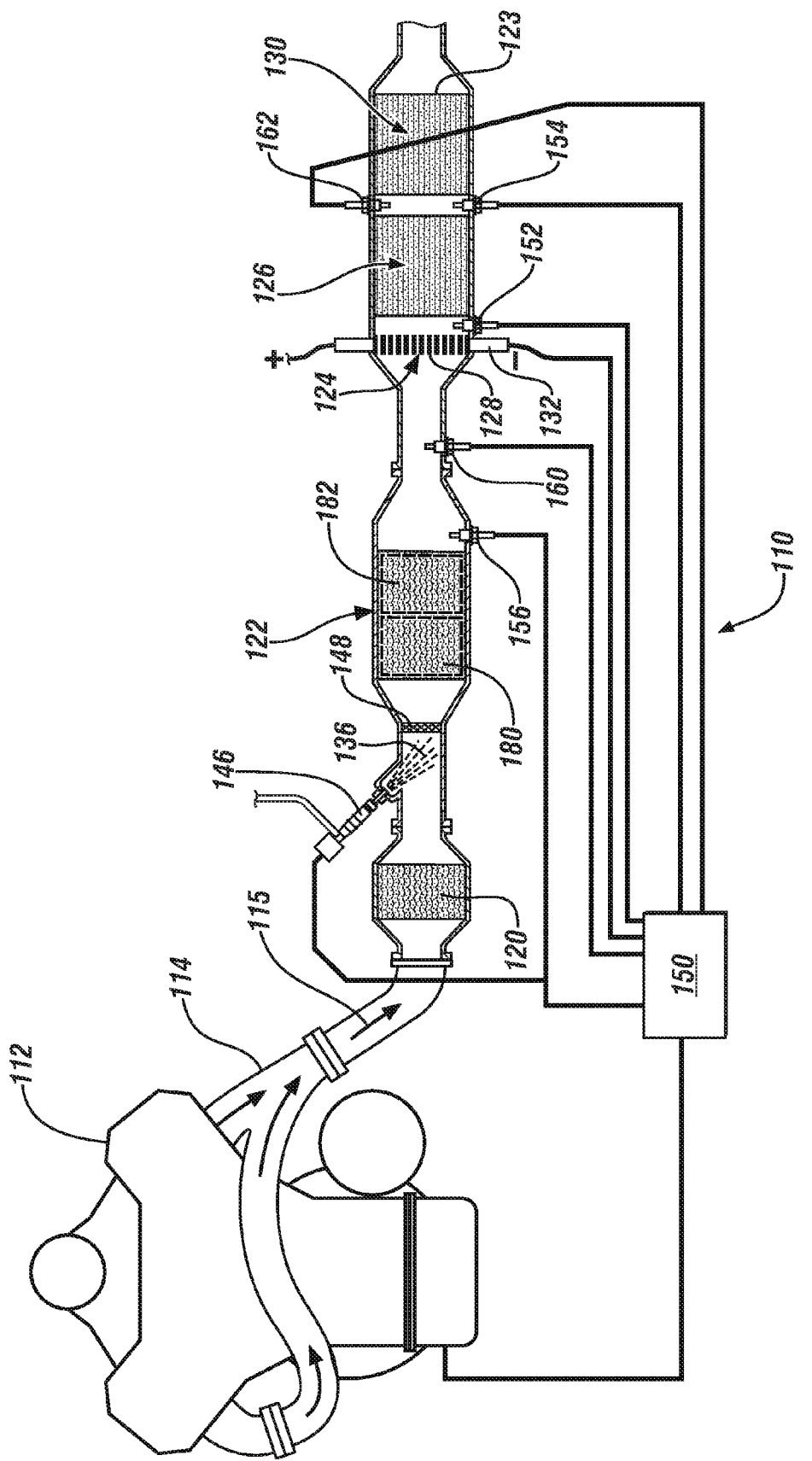
FIG. 2 is an alternative illustration of the exhaust gas treatment system shown in FIG. 1.

In one embodiment, the flow-through container of absorbent particles 22 includes two distinct sections, and is illustrated in FIG. 2. FIG. 2 illustrates an alternative embodiment of an exhaust gas treatment system 110. In the alternative embodiment as shown in FIG. 2, the exhaust gas treatment system 110 includes a flow-through container of absorbent particles 122 having a first section 180 positioned upstream of a second section 182. The first section 180 of the flow-through container of absorbent particles 122 includes an SCR catalyst composition applied thereto for converting $NO_x$ constituents in the exhaust gas 115 in the presence of a reductant such as ammonia. The second section 182 of the flow-through container of absorbent particles 122 includes a washcoat of water absorbent particles configured for temporarily storing water collected from the exhaust gas 15 below a threshold temperature. That is, the second section 182 does not include an SCR catalyst composition applied thereto for converting $NO_x$ constituents in the exhaust gas 15. The exhaust gas treatment system 110 also includes an OC device 120 that is located upstream in a separate canister from the flow-through container of absorbent particles 122.

Turning back to FIG. 1, the EHC device 24 is disposed downstream of both the OC device 20 and the flow-through container of absorbent particles 22. The EHC device 24 includes a monolith 28 and an electrical heater 32, where the electrical heater 32 is selectively activated and heats the monolith 28. The electrical heater 32 is connected to an electrical source (not shown) that provides power thereto. In one embodiment, the electrical heater 32 operates at a voltage of about 12-24 volts and at a power range of about 1-3 kilowatts, however it is understood that other operating conditions may be used as well. The EHC device 24 may be constructed of any suitable material that is electrically conductive such as the wound or stacked metal monolith 28. An oxidation catalyst compound (not shown) may be applied to the EHC device 24 as a wash coat and may contain platinum group metals such as platinum ("Pt"), palladium ("Pd"), rhodium ("Rh") or other suitable oxidizing catalysts, or combination thereof.

The SCR device 26 may be disposed downstream of the EHC device 24, the flow-through container of absorbent particles 22, and the OC device 20. In a manner similar to the OC device 20, the SCR device 26 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant such as ammonia.

In the example as shown, an ammonia reductant 36 may be supplied from a reductant supply source (not shown) and may be injected into the exhaust gas conduit 14 at a location upstream of the SCR device 26 using an injector 46, or other suitable method of delivery of the reductant to the exhaust gas 15. The reductant 36 may be in the form of a gas, a liquid, or an aqueous urea solution and may be mixed with air in the injector 46 to aid in the dispersion of the injected spray. A mixer or turbulator 48 may also be disposed within the exhaust conduit 14 in close proximity to the injector 46 to further assist in thorough mixing of the reductant 36 with the exhaust gas 15. In the embodiment as shown in FIG. 1, the injector 46 is positioned downstream of the flow-through container of absorbent particles 22 and upstream of the EHC device 24. Referring to the embodiment as shown in FIG. 2, the injector 146 is positioned downstream of an OC device 120, and upstream of the first SCR section 180 of the flow-through container of absorbent particles 122. In the embodiment as shown in FIG. 2, a portion of a reductant 136 slips or passes through the first SCR section 180 of the flow-through container of absorbent particles 122 and is received by an SCR device 126.

Referring again to FIG. 1, the PF device 30 may be disposed downstream of the SCR device 26. The PF device 30 operates to filter the exhaust gas 15 of carbon and other particulates. In various embodiments, the PF device 30 may be constructed using a ceramic or SiC wall flow monolith filter 23 that may be packaged in a shell or canister constructed of, for example, stainless steel, and that has an inlet and an outlet in fluid communication with exhaust gas conduit 14. The ceramic or SiC wall flow monolith filter 23 may have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the IC engine 12. It is appreciated that the ceramic or SiC wall flow monolith filter 30 is merely exemplary in nature and that the PF device 30 may include other filter devices such as wound or packed fiber filters, open cell foams, sintered metal fibers, etc.

A control module 50 is operably connected to and monitors the engine 12 and the exhaust gas treatment system 10 through a number of sensors. The control module 50 is also operably connected to the electrical heater 32 of the EHC device 24, the engine 12 and the reductant injector 46. FIG. 1 illustrates the control module 50 in communication with three temperature sensors 52, 54, and 56 located in the exhaust gas conduit 14. The first temperature sensor 52 is situated upstream of the SCR device 26, and the second temperature sensor 54 is located downstream of the SCR device 26. The third temperature sensor is placed downstream of the flow-through container of absorbent particles 22 and is in communication with the control module 50 for detecting the temperature of the flow-through container of absorbent particles 22. The temperature sensors 52, 54, and 56 send electrical signals to the control module 50 that each indicate the temperature in the exhaust gas conduit 14 in specific locations. The control module 50 is also in communication with two $NO_x$ sensors 60 and 62 that are in fluid communication with the exhaust gas conduit 14. Specifically, the first $NO_x$ sensor 60 is located downstream of the internal combustion engine 12 and upstream of the SCR device 26 to detect a $NO_x$ concentration level. The second $NO_x$ sensor 62 is located downstream of the SCR device 26 to detect the $NO_x$ concentration level in the exhaust gas conduit 14 in specific locations.

The control module 50 includes control logic for monitoring the first temperature sensor 52 and the second temperature sensor 54 and for calculating a temperature profile of the SCR device 26. Specifically, the first temperature sensor 52 and the second temperature sensor 54 are averaged together to create the temperature profile of the SCR device 26. The control module 50 also includes control logic for selectively activating or deactivating the EHC device 24 based on the temperature profile of the SCR device 26. Specifically, if the temperature profile of the SCR device 26 is above a light-off or minimum operating temperature, then the electrical heater 32 is deactivated, and no longer heats the EHC device 24. However, as long as the temperature profile of the SCR device 26 is below the light-off temperature the electrical heater 32 is activated or remains activated, and heat is provided to the SCR device 26. The SCR device 26 is heated to the light-off temperature, which generally effectively reduces the amount of $NO_x$ in the exhaust gas 15. Specifically, the $NO_x$ in the exhaust gas 15 is reduced to nitrogen after light-off of the SCR device 26.

The control module 50 also includes control logic for monitoring the temperature of the EHC device 24. Specifically, the control module 50 may monitor the temperature of the EHC device 24 by several different approaches. In one approach, the first temperature sensor 52 positioned downstream of the EHC device 24 and in communication with the control module 50 detects the temperature of the EHC device 24. In an alternative approach, the control module 50 includes control logic for determining the temperature of the EHC device 24 based on operating parameters of the exhaust gas system 10. Specifically, the temperature of the EHC device 24 may be calculated based on the exhaust flow of the engine 12, an input gas temperature of the engine 12, and the electrical power provided to the electrical heater 32. The exhaust flow of the engine 12 is calculated by adding the intake air mass of the engine 12 and the fuel mass of the engine 12, where the intake air mass is measured using an intake mass air flow sensor (not shown) of the engine 12, which measures air mass flow entering the engine 12. The fuel mass flow is measured by summing the total amount of fuel injected into the engine 12 over a given period of time. The fuel mass flow is added to the air mass flow rate to calculate the exhaust flow of the engine 12.

The control module 50 may also include control logic for determining the water storage capacity of the flow-through container of absorbent particles 22. Specifically, the absorbent particles are specifically configured for holding water until the threshold temperature is reached. The control module 50 includes control logic for monitoring the third temperature sensor 56 that represents the temperature of absorber 22. The control module 50 further includes control logic for determining the water storage capacity of the absorber 22 based on the temperature of the absorber 22. This is because the absorbent particles tend to store more water at lower temperatures, and tend to release or desorb the water at higher temperatures. As described above, in one embodiment the absorbent particles are configured for temporarily storing water collected from the exhaust gas 15 below a threshold temperature. Once the flow-through container of absorbent particles 22 reaches the threshold temperature, substantially all of the absorbed water is released.

The control module 50 includes control logic for determining if the temperature of the EHC device 24 is above a threshold or EHC light-off temperature. In one exemplary embodiment, the EHC light-off temperature is about 250° C. If the temperature of the EHC device 24 is above the EHC light-off temperature, then the control module 50 includes control logic for de-energizing an electrical source (not shown) of the electrical heater 32. In the event that the EHC device 24 is de-energized, then the control module 50 may include control logic for continuously adjusting the plurality of operating parameters of the engine 12 to control the temperature of the exhaust gas 15 that is provided to the SCR device 26. Thus, in the event that the EHC device 24 is de-energized, operating parameters of the engine 12 may be modified to provide heat to the SCR device 26 such that the SCR device 26 attains light-off.

The control module 50 includes control logic for determining an amount of $NO_x$ in the exhaust gas 15 reduced by the SCR device 26. The amount of $NO_x$ in the exhaust gas 15 reduced by the SCR device 26 may be calculated based on the output of the first $NO_x$ sensor 60, the second $NO_x$ sensor 62, and the SCR temperature profile based on the first and second temperature sensors 52 and 54. The control module 50 includes control logic for determining the amount of reductant 36 consumed by the SCR device 26, where the amount of the reductant 36 consumed is based on the amount of $NO_x$ in the exhaust gas 15 reduced by the SCR device 26. The control module 50 may also include control logic for activating the reductant injector 46 to replenish the reductant 36 that is consumed by the SCR device 26. For example, in one embodiment the control module 50 includes control logic for determining the amount of the reductant 36 that the SCR device 26 has stored therein during a previous cold start of the engine 12. The control module 50 further includes control logic for activating the reductant injector 46 to replace the reductant 36 to the level during the previous cold start of the engine 12.

Before reaching the light-off temperature, the SCR device 26 typically acts as a $NO_x$ adsorber with the presence of $NH_3$. That is, the SCR device 26 is configured for trapping and storing the $NO_x$ until the light-off temperature of the SCR device 26 has been attained. However, the exhaust gas 15 contains water vapor, which decreases the storage capacity of $NO_x$ over the SCR device 26. Thus, the flow-through container of absorbent particles 22 located upstream from the SCR device 26 is provided in an effort to temporarily store water collected from the exhaust gas 15 below a threshold temperature. The flow-through container of absorbent particles 22 reduces or substantially eliminates the amount of water vapor that reaches the SCR device 26 before the SCR device 26 reaches the light-off temperature.

The EHC device 24 is provided in an effort to heat the SCR device 26 to the light-off temperature before the flow-through container of absorbent particles 22 reaches the threshold temperature. This is because once the flow-through container of absorbent particles 22 reaches the threshold temperature, substantially all of the water absorbed by the absorbent particles will be released. The release of water to the SCR device 26 may decrease the amount of $NO_x$ the SCR device 26 is able to trap and store before reaching the light-off temperature. Thus, the EHC device 24 is provided such that the SCR device 26 typically reaches the light-off temperature before the flow-through container of absorbent particles 22 reaches the threshold temperature.

Figure 3:
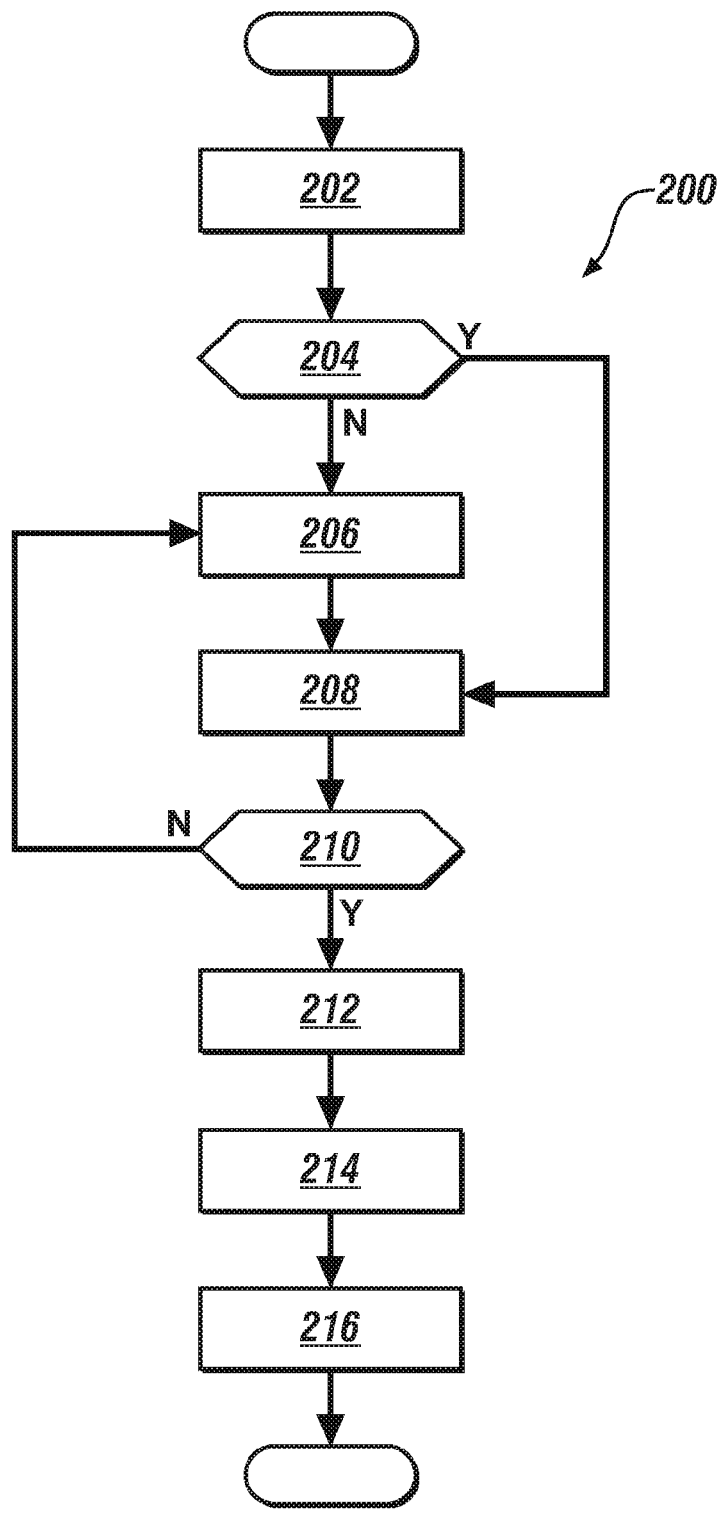
FIG. 3 is a process flow diagram illustrating a method of activating an electrically heated catalyst ("EHC") and a selective catalytic reduction device ("SCR") illustrated in FIG. 1.

A method of operating the exhaust gas treatment system 10 will now be explained. Referring to FIG. 3, an exemplary process flow diagram illustrating an exemplary process of operating the exhaust gas treatment system 10 is generally indicated by reference number 200. Process 200 begins at step 202, where a control module 50 includes control logic for monitoring the temperature of an EHC device 24. As discussed above, the control module 50 may monitor the temperature of the EHC device 24 by several different approaches. In one approach, a first temperature sensor 52 positioned downstream of the EHC device 24 and in communication with the control module 50 detects the temperature of the EHC device 24. In an alternative approach, the control module 50 includes control logic for determining the temperature of the EHC device 24 based on operating parameters of the exhaust gas system 10. Process 200 may then proceed to step 204.

In step 204, the control module 50 includes control logic for determining if the EHC device 24 is above the light-off temperature. If the EHC device 24 is above the light-off temperature, then the EHC device 24 may be deactivated, and process 200 proceeds to step 208. If the EHC device 24 is below the light-off temperature, process 200 proceeds to step 206, where the electrical heater 32 is activated. Process 200 may then proceed to step 208.

In step 208, the control module 50 includes control logic for monitoring a temperature profile of an SCR device 26 to determine if the SCR device 26 is above or below a respective light-off temperature. Specifically, referring to FIG. 1, the control module 50 is in communication with two temperature sensors 52 and 54 located in an exhaust gas conduit 14, where the first temperature sensor 52 is situated upstream of the SCR device 26, and the second temperature sensor 54 is located downstream of the SCR device 26. The control module 50 includes control logic for monitoring the first temperature sensor 52 and the second temperature sensor 54 and for calculating a temperature profile of the SCR device 26. Specifically, the first temperature sensor 52 and the second temperature sensor 54 are averaged together to create the temperature profile of the SCR device 26. Process 200 may then proceed to step 210.

In step 210, the control module 50 includes control logic for determining if the SCR device 26 is above or below the light-off temperature. In the event that the SCR device 26 is above the light-off temperature, process 200 may then proceed to step 212. If the SCR device 26 is below the respective light-off temperature, process 200 may then return to step 206, where the electric heater 32 is activated. However, in the event that the EHC device 24 was deactivated in step 204, then the control module 50 may include control logic for continuously adjusting the plurality of operating parameters of the engine 12 to control the temperature of the exhaust gas 15 that is provided to the SCR device 26 such that the SCR device 26 attains light-off.

In step 212, the control module 50 includes control logic for deactivating the electrical heater 32 of the EHC device 24. Process 200 may then proceed to step 214.

In step 214, the control module 50 includes control logic for determining an amount of NOx in the exhaust gas 15 reduced by the SCR device 26 and then determining an amount of the reductant 36 that is consumed by the SCR device 26 based on the amount of NOx reduced. The amount of NOx in the exhaust gas 15 reduced by the SCR device 26 may be calculated based on the output of a first NOx sensor 60, a second NOx sensor 62, and the SCR temperature profile temperature based on the first and second temperature sensors 52 and 54. Process 200 may then proceed to step 216.

In step 216, the control module 50 includes control logic for activating a reductant injector 46 to dose the reductant 36 to the SCR device 26. Specifically, in one exemplary embodiment of the exhaust gas treatment system 10, the control module 50 includes control logic for activating the reductant injector 46 to replenish the reductant 36 that is consumed by the SCR device 26. Process 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, comprising:
    an exhaust gas conduit in fluid communication with, and configured to receive an exhaust gas from the internal combustion engine, the exhaust gas containing oxides of nitrogen ("$NO_x$") and water; an oxidation catalyst ("OC") device in fluid communication with the exhaust gas conduit and configured to receive the exhaust gas, wherein the OC device treats hydrocarbon and carbon monoxide to form carbon dioxide and water;
    a flow-through container of absorbent particles in fluid communication with the exhaust gas conduit and configured to receive the exhaust gas wherein the flow-through container is located downstream of the OC device, wherein the flow-through container substantially adsorbs water from the exhaust gas below a threshold temperature;

an electrically heated catalyst ("EHC") device in fluid communication with the exhaust gas conduit and configured to receive the exhaust gas, wherein the EHC device is located downstream of the OC device and the flow through container of absorbent particles, and wherein the EHC device is selectively activated to produce heat;

a selective catalytic reduction ("SCR") device in fluid communication with the exhaust gas conduit and configured to receive the exhaust gas, wherein the SCR device is located downstream of the flow through container and next to the EHC device, and wherein the SCR device is selectively heated by the EHC device to a SCR light-off temperature, and wherein the overall temperature of the SCR device is represented by a SCR temperature profile; and a control module in communication with the EHC device, comprising:
  a control logic for determining the SCR temperature profile; and
  a control logic for activating the EHC device if the SCR temperature profile is below the SCR light-off temperature, wherein the EHC device is selectively activated to heat the SCR device to the SCR light-off temperature before the flow-through container of absorbent particles reaches the threshold temperature.

2. The exhaust treatment system of claim 1, further comprising:
  a first temperature sensor situated upstream of the SCR device; and
  a second temperature sensor situated downstream of the SCR device.

3. The exhaust treatment system of claim 2, wherein the control module includes control logic for monitoring the first temperature sensor and the second temperature sensor.

4. The exhaust treatment system of claim 3, wherein the control module includes a control logic for determining an EHC temperature of the EHC device based on the first temperature sensor, and wherein the control module includes control logic for deactivating the EHC device if the EHC temperature is above an EHC light-off temperature.

5. The exhaust treatment system of claim 3, wherein the control module includes a control logic for calculating the SCR temperature profile based on signals from the first temperature sensor and the second temperature sensor, wherein the temperatures of the first temperature sensor and the second temperature sensor are averaged together to create the SCR temperature profile.

6. The exhaust treatment system of claim 5, wherein a reductant injector is in fluid communication with the exhaust gas conduit and is in signal communication with the control module, and wherein the reductant injector is configured for dosing a reductant.

7. The exhaust treatment system of claim 6, further comprising a first $NO_x$ sensor and a second $NO_x$ sensor that are in fluid communication with the exhaust gas conduit, the first $NO_x$ sensor located downstream of the internal combustion engine and upstream of the SCR device and the second $NO_x$ sensor located downstream of the SCR device, and wherein the control module includes control logic for determining an amount of $NO_x$ in the exhaust gas reduced by the SCR device based on the first $NO_x$ sensor, the second $NO_x$ sensor, and the SCR temperature profile temperature.

8. The exhaust treatment system of claim 7, wherein the control module includes control logic for determining an amount of the reductant the SCR device has stored therein during a previous cold start of the internal combustion engine.

9. The exhaust treatment system of claim 8, wherein the control module includes control logic for determining an amount of the reductant that has been consumed by the SCR device to convert the amount of $NO_x$ in the exhaust gas reduced by the SCR device.

10. The exhaust treatment system of claim 9, wherein the control module includes control logic for activating the reductant injector to replace the reductant consumed by the SCR device to the amount of the reductant the SCR device has stored therein during the previous cold start of the internal combustion engine.

11. The exhaust treatment system of claim 1, wherein the threshold temperature is about 100° C.

12. The exhaust treatment system of claim 1, wherein the flow-through container of absorbent particles includes one of alumina particles, activated carbon particles, water absorbent zeolite materials, and water absorbent molecular sieve materials.

13. The exhaust treatment system of claim 1, wherein the flow-through container of absorbent particles includes a selective catalyst composition applied as a washcoat on surfaces of a flow-through support.

14. The exhaust treatment system of claim 1, wherein a portion of the flow-through container of absorbent particles includes a selective catalyst composition applied as a washcoat on surfaces of a flow-through support, and a remaining portion of the flow-through container of absorbent particles does not include the selective catalyst composition.

15. The exhaust treatment system of claim 1, wherein the control module includes control logic for monitoring a water holding capacity of the flow-through container of absorbent particles.

16. An exhaust gas treatment system for an internal combustion engine, comprising:
  an exhaust gas conduit in fluid communication with, and configured to receive an exhaust gas from the internal combustion engine, the exhaust gas containing oxides of nitrogen ("$NO_x$") and water;
  an oxidation catalyst ("OC") device in fluid communication with the exhaust gas conduit and configured to receive the exhaust gas, wherein the OC device treats hydrocarbon and carbon monoxide to form carbon dioxide and water;
  a flow-through container of absorbent particles in fluid communication with the exhaust gas conduit and configured to receive the exhaust gas, wherein the flow-through container is located downstream of the OC device, wherein the flow-through container substantially adsorbs water from the exhaust gas below a threshold temperature;
  an electrically heated catalyst ("EHC") device in fluid communication with the exhaust gas conduit and configured to receive the exhaust gas, wherein the EHC device is located downstream of the OC device and the flow through container, and wherein the EHC device is selectively activated to produce heat;
  a selective catalytic reduction ("SCR") device in fluid communication with the exhaust gas conduit and configured to receive the exhaust gas, wherein the SCR device is located downstream of the flow through container and next to the EHC device, and wherein the SCR device is selectively heated by the EHC device to a SCR light-off temperature, and wherein the overall temperature of the SCR device is represented by a SCR temperature profile;
  a first temperature sensor and a second temperature sensor, the first temperature sensor situated upstream of the SCR device and the second temperature sensor situated downstream of the SCR device; and a control module in communication with the EHC device, the first temperature sensor, and the second temperature sensor, comprising:

a control logic for monitoring the first temperature sensor and the second temperature sensor;

a control logic for calculating the SCR temperature profile based on signals from the first temperature sensor and the second temperature sensor, wherein the temperatures of the first temperature sensor and the second temperature sensor are averaged together to create the SCR temperature profile; and a control logic for activating the EHC device if the SCR temperature profile is below the SCR light-off temperature, wherein the EHC device is selectively activated to heat the SCR device to the SCR light-off temperature before the flow-through container of absorbent particles reaches the threshold temperature.

17. The exhaust treatment system of claim 16, wherein a reductant injector is in fluid communication with the exhaust gas conduit and is in signal communication with the control module, and wherein the reductant injector is configured for dosing a reductant.

18. The exhaust treatment system of claim 17, further comprising a first $NO_x$ sensor and a second $NO_x$ sensor that are in fluid communication with the exhaust gas conduit, the first $NO_x$ sensor located downstream of the internal combustion engine and upstream of the SCR device and the second $NO_x$ sensor located downstream of the SCR device, and wherein the control module includes control logic for determining an amount of $NO_x$ in the exhaust gas reduced by the SCR device based on the first $NO_x$ sensor, the second $NO_x$ sensor, and the SCR temperature profile temperature.

19. The exhaust treatment system of claim 18, wherein the control module includes control logic for determining an amount of the reductant the SCR device has stored therein during a previous cold start of the internal combustion engine.

20. The exhaust treatment system of claim 19, wherein the control module includes control logic for determining an amount of the reductant that has been consumed by the SCR device to convert the amount of $NO_x$ in the exhaust gas reduced by the SCR device, and wherein the control module includes control logic for activating the reductant injector to replace the reductant consumed by the SCR device to the amount of the reductant the SCR device has stored therein during the previous cold start of the internal combustion engine.

* * * * *